April 29, 1969  K. T. DISLEY ET AL  3,441,006

WASTE HEAT BOILERS

Filed Feb. 20, 1967

United States Patent Office 3,441,006
Patented Apr. 29, 1969

3,441,006
WASTE HEAT BOILERS
Kenneth Thomas Disley, Roy George Pearce, Leonard Henry Christopher, and Leonard James Culver, London, England, assignors to Foster Wheeler Corporation, New York, N.Y., a corporation of New York
Filed Feb. 20, 1967, Ser. No. 617,297
Int. Cl. F22d 1/28
U.S. Cl. 122—7    11 Claims

ABSTRACT OF THE DISCLOSURE

Waste heat boiler comprising upper and lower drums, with water feed into lower drum in liquid to liquid heat exchange to cool water being removed to slightly above dew point. The boiler also including a proportioning valve dividing the water feed into the lower drum into two inlet pipes and controlled by a thermostat located at the furnace inlet line. One inlet pipe feeding water directly into the boiler and the other inlet pipe feeding water directly into a liquid to liquid heat exchange located within the boiler and connecting to the furnace inlet line. The thermostat sensing the temperature of the water at the furnace inlet line will control the proportioning valve so that the higher the temperature at the furnace inlet line, the more feed water will be directed to the heat exchange to produce water entering the furnace at a temperature so as to remove the maximum heat from the furnace while avoiding the cooling of the furnace to a temperature where corrosion would occur.

---

Figure 1:
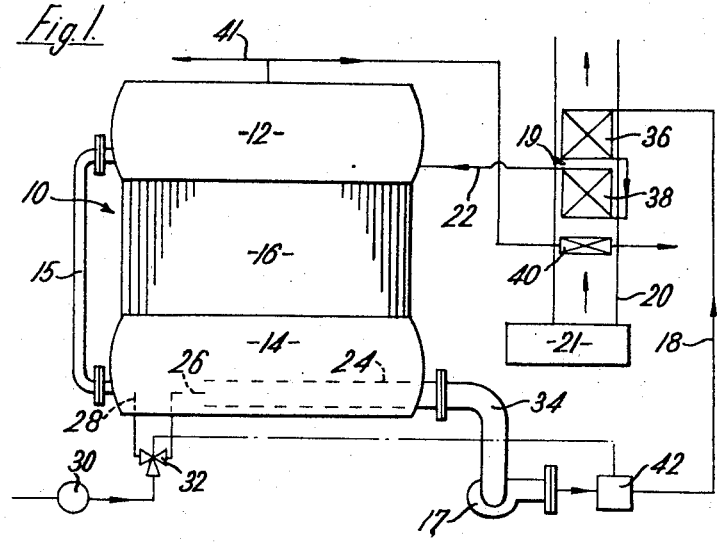

This invention relates to waste heat recovery boilers and especially boilers for the recovery of heat from the exhaust gases of the diesel propulsion engines of ships.

Where herein the terms "water" and "steam" are to be construed as references to any liquid and its vapour unless the context requires otherwise.

Very large diesel engines are now available and are being used to propel large ships such as oil tankers. As much as one third of the useful heat provided by the diesel fuel is, however, present in the exhaust gases and for reasons of economy, therefore, it is important to recover as much of this heat as possible.

This heat can be recovered by providing a steam boiler having heating surfaces which can be heated by the exhaust gases and heating surfaces which can be heated by independent burners. The steam from this boiler can be used for auxiliary services such as lighting and heating and, in the case of oil tankers, for pumping loads. In this way during passage of the ship all, or a major proportion of the steam is generated by waste heat from the diesel engine, while in dock the independent burners can be used to heat the boiler.

It is important to remove as much heat as possible from the exhaust gases, but on the other hand there is a limit below which the exhaust gases must not be cooled if one is to avoid corrosion problems. The temperature of the boiling water in the boiler is usually above the lower temperature to which the exhaust gases can be cooled without corrosion problems while the temperature of the boiler feed water is below the lower temperature.

It is therefore an object of the invention to provide an extremely simple arrangement whereby useful heat can be removed from the exhaust gases without encountering corrosion problems.

In accordance with the invention there is provided a waste heat recovery boiler for use in extracting heat from hot exhaust gases in which water from the steam and water drum or water drum of the boiler is cooled within the drum by direct or indirect heat exchange with the boiler feed water to such a temperature that the cooled water can be used to extract heat from the exhaust gases without cooling them below a temperature at which condensation and/or corrosion can occur.

Cooling the water which is used to extract heat from the exhaust gases in the steam and water drum or water drum provides a number of advantages including the important advantage that the amount of heat removed from the hot exhaust can be the maximum amount permissable which does not cool the gases below their dew point so that condensation and corrosion can occur. The arrangement is cheap and space-saving since no extra equipment outside the drum is necessary and is simple to control and operate.

The waste heat recovery boiler will preferably be one which has heating surfaces positioned in a flue or the like carrying the hot exhaust gases and other heating surfaces which are heated by hot combustion gases from a furnace, the two heating surfaces having common steam and water and water drum or a common steam and water drum.

Figure 2:
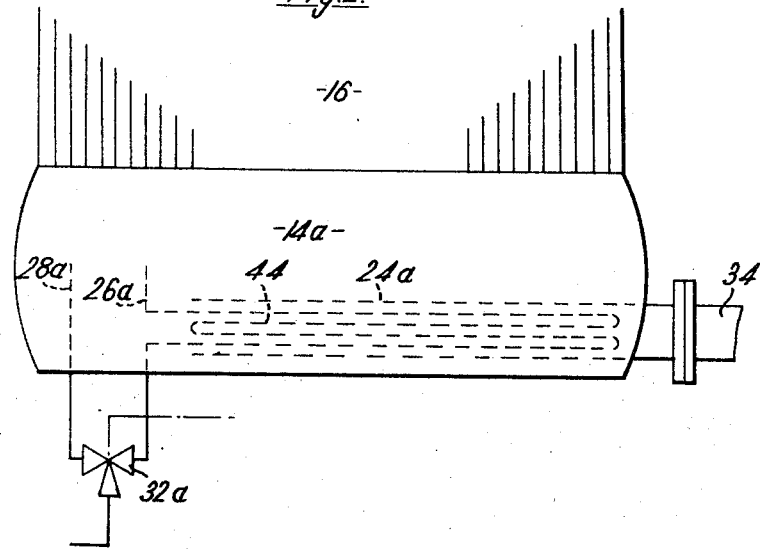

Examples of waste heat recovery boilers in accordance with the invention are shown in the accompanying diagrammatic drawings, in which:

FIGURE 1 is a flow sheet of one boiler; and
FIGURE 2 is a detail of a modified boiler.

The waste heat recovery boiler 10 for a ship shown in FIGURE 1 comprises an upper steam and water drum 12 and a lower water drum 14 joined by an unheated downcomer 15 and by a bank of riser tubes 16. Water taken from the lower drum 14 is circulated by a pump 17 through a line 18 to a steam generating section 19 positioned in the exhaust flue 20 from a diesel engine 21 used for propelling the ship, which flue leads to the exhaust chimney, and a steam and water mixture is removed from the section 19 and returned through a line 22 to the upper drum 12.

Water is removed from the lower drum 14 through an open-ended length of pipe 24 positioned within the drum. Two inlet pipes 26 and 28 are provided for the feed water and the pipe 26 terminates adjacent to the open end of the pipe 24. Feed water is fed to the pipes 26 and 28 by a feed pump 30 and a proportioning valve 32 which can adjust the relative proportions of feed water fed to the drum by the two pipes 26 and 28. The pipe 24 is joined just outside the drum 14 to a pipe 34 which is connected to the pump 17.

To avoid or reduce flow problems through boiling in the section 19 it is divided into upper and lower sections 36 and 38. In the upper section 36 the water flow is counter-current to the flow of exhaust gases to remove the maximum amount of heat from them commensurate with avoiding cooling of the exhaust gases in the flue to below their dew point, while in the lower section 38 the flow of water and steam is upwardly in con-current flow with the exhaust gases. The upper drum 12 can be provided with driers for removing water droplets from the steam before it is removed from the drum. This steam removed can be superheated if desired in a superheater 40 positioned in the flue 20 before the section 19. The superheated steam can be used to drive a turbine to give electrical power and for all auxiliary services on the ship. Also lower grade steam direct from the drum 12 through the line 41 can be used for heating and evaporating sea water.

A thermostat 42 is positioned in the line 18 and this is arranged automatically to control the proportioning valve 32 so that the higher the temperature of the water in the line 18 the more feed water is injected into the pipe 24 by the pipe 26, so reducing the temperature of the water in the line 18. If desired the valve can be controlled manually.

The riser tubes 16 can be heated by the combustion gases from burners (not shown) so as to supplement the supply of steam from the section 19 or to generate all the steam when the ship is in dock and the diesel engine 21 is not working. The combustion gases from the burner can be fed into the flue 20 after they have been used to heat the water in the riser tubes 16.

When the ship is at sea at least the major proportion of the steam requirement is generated from the exhaust heat of the diesel engine 21. A typical temperature of the exhaust gases from the engine 21 is about 600° F., while a typical saturated steam temperature for the boiler 10 is about 356° F. In order to remove the maximum possible heat from the exhaust gases without at the same time experiencing corrosion problems the temperature of the water fed to the section 19 should be about 300° F. This is achieved by arranging for the valve 32 to inject the necessary amount of feed water, at a typical temperature of about 120° F. into the end of the pipe 24. In the section 19 the water initially at about 300° F. is converted to a steam and water mixture at a temperature of about 356° F. which is then returned to the drum 12. In so doing the temperature of the exhaust gases is reduced to about 376° F. These temperatures are illustrative and can be adjusted to suit a particular waste heat boiler.

Some control over the output of the boiler 10 is inherently achieved because as the steam demand drops so the temperatures and pressures in the boiler will rise with the result that warmer water can be circulated to the section 19 and less heat removed from the exhaust gases. The control exercised by the thermostat 42 over the valve 32 can be arranged to allow this.

When the engine 21 is not working and the boiler is being heated by the combustion gases from the burners the pump 17 can be stopped, or can be kept running to circulate hot water through the section 19 to prevent condensation and/or corrosion.

FIGURE 2 shows a modified lower water drum 14a of another boiler, the remainder of the boiler being similar in arrangement and operation to the boiler described above in connection with FIGURE 1.

The drum 14a has a pipe 24a through which water is drawn from the drum to be circulated to the section 19. In this pipe 24a is positioned a coil 44 fed with feed water by a pipe 26a. During passage through the coil 44 the feed water cools the water to be circulated to the section 19 while it is itself heated. After passing through the coil the heated feed water passes into the drum.

Another inlet pipe 28a is provided for the feed water and a valve 32a is arranged to apportion the feed water between the pipes 26a and 28a so as to ensure that water of the desired temperature is circulated to the section 19.

Although the boilers described have been provided with an upper steam and water drum and a lower water drum, the invention is applicable to boilers having a single steam and water drum, the water being force-circulated to heating surfaces such as the riser tubes 16. In this case, or in the case of boilers having two drums the tubes 24 and 24a can be positioned within the steam and water drum and the feed water fed to that drum as well.

The boilers just described have a number or advantages. The amount of heat which is removed from the gases in the flue 20 can be the maximum allowable without experiencing difficulties with corrosion and condensation by the flue gases occuring because they have been cooled below the dew point. The boilers are simple and require very little extra cost and no more space than a boiler where water at boiler temperature is fed to the section 19. Further the pump 17 is not subjected to such high temperature since it pumps water at a temperature of, for example, about 300° F. instead of water at boiler temperature of, for example, about 356° F.

A further advantage of the boilers shown is that the feed pump 30 and the circulation pump 17 do not need careful matching to ensure good flow which would be the case if the feed pump led directly into say the line 18.

We claim:
1. A waste heat recovery boiler for use in extracting heat from hot exhaust gases, comprising a flue for said gases, heating surfaces positioned in said flue, a drum, means for removing water from said drum and passing it to said heating surfaces, means for returning fluid heated in said heating surfaces by said hot exhaust gases, a supply of boiler feed water to said drum, and apportioning means within said drum for cooling said water removed from said drum by liquid to liquid heat exchange with at least part of said feed water, whereby the water removed from said drum is cooled to such a temperature that the maximum heat is withdrawn from said hot exhaust gases, and said gases are cooled to a temperature above their dew point.

2. A waste heat recovery boiler for use in extracting heat from hot exhaust gases, comprising a flue for said exhaust gases, first heating surfaces in said flue, second heating surface, a furnace arranged to provide hot combustion gases for heating said second heating surfaces, a steam and water drum for receiving steam and water heated in both said first and second heating surfaces, a water drum for supplying water to both said first and second heating surfaces, downcomer means between said steam and water drum and water drum, a boiler feed water supply fed to said water drum, heat exchange means in said water drum including controlled apportioning means for cooling water removed from said drum before supply to said first heating surfaces by heat exchange with at least a part of said feed water, said water being cooled to such a temperature that the hot exhaust gases in contact with said first heating surfaces are at a temerature above their dew point.

3. A boiler according to claim 2 further comprising superheating surfaces in said flue, and conduit means for conducting steam from said steam and water drum to said superheating surfaces.

4. A waste heat recovery boiler for use in extracting heat from hot exhaust gases, comprising a furnace, a boiler heated by hot combustion gases from said furnace, said boiler having a drum and a supply of feed water to said drum, heating surfaces for extracting heat from said hot exhaust gases, means for withdrawing water from said drum, passing it to said heating surfaces, and returning heated water to said boiler, and apportioning means in said drum for passing said water withdrawn from said drum in liquid to liquid heat exchange with at least a part of said feed water so that said water withdrawn from said drum is at such a temperature that said exhaust gases are cooled by contact with said heating surfaces to a temperature above which condensation and corrosion can occur.

5. A boiler according to claim 4 further comprising heat sensing means for sensing the temperature of the water withdrawn from said drum, and valve means controlled by said sensing means depending on the temperature of the water withdrawn to apportion the feed water to the withdrawn water for cooling said hot exhaust gases to a temperature slightly above a temperature at which condensation and corrosion occur.

6. A boiler according to claim 4 further comprising a pipe projecting into said drum, an inlet to said pipe within said drum for the passage of water within said drum, means for supplying a part of said feed water to said drum at a position near said inlet where it can enter the pipe, and conduit means connected between said pipe and said heating surfaces, said water fed to said heating surfaces being cooled in said pipe by direct heat exchange with said feed water.

7. A boiler according to claim 4 further comprising superheating surfaces positioned in contact with said hot exhaust gases, and conduit means for supplying steam from said boiler to said superheating surfaces.

8. A waste heat recovery boiler for use in extracting heat from hot exhaust gases, comprising a flue for said exhaust gases, first heating surfaces in said flue, second heating surfaces, a furrnace arranged to provide hot combustion gases for heating said second heating surfaces, a drum connected to both said first and said second heating surfaces, apportioning means for supplying feed water to said drum, pipe means within said drum having an inlet positioned within said drum, conduit means connected to said pipe means for withdrawing water therefrom and feeding it to said first heating surfaces, the water withdrawn from said pipe means having a temperature which is below that of the water in said drum by heat exchange with boiler feed water and which is such that the hot exhaust gases in said flue are cooled by said first heating surfaces to a temperature above their dew point.

9. A boiler according to claim 8 in which said apportioning feed water supply means include a feed inlet positioned near said inlet to said pipe means so that feed water enters said pipe means, whereby the water in said pipe means is cooled by direct heat exchange with feed water.

10. A boiler according to claim 8 further comprising a heat exchange coil positioned within said pipe means, means for feeding to said coil at least part of the feed water from said means for supplying feed water, said coil having an outlet into said drum, whereby the said water in said pipe is cooled by indirect heat exchange with said feed water.

11. A boiler according to claim 8 in which said apportioning means for supplying feed water include a first branch leading directly to said drum, a second branch leading feed water in heat exchange with said water in said pipe means, and an apportioning valve arranged to apportion the flow of feed water between said branches, a temperature sensing means being provided for water withdrawn from said pipe means and controlling the apportioning valve so as to keep the temperature of said water withdrawn from said pipe means substantially constant.

References Cited

UNITED STATES PATENTS

| 2,372,992 | 4/1945 | Wallis et al. | 122—7 |
| 3,095,861 | 7/1963 | Norris | 122—7 |
| 3,177,659 | 4/1965 | Berman | 122—7 X |
| 3,202,134 | 8/1965 | Marcheix | 122—7 X |

FOREIGN PATENTS

| 426,516 | 4/1935 | Great Britain. |
| 648,121 | 12/1950 | Great Britain. |

CHARLES J. MYHRE, *Primary Examiner.*